US011306762B2

(12) United States Patent
Gormley

(10) Patent No.: US 11,306,762 B2
(45) Date of Patent: Apr. 19, 2022

(54) BARREL NUT RETAINER FROM ONE-WAY INSTALLATION GUIDE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 252 days.

(21) Appl. No.: 16/505,968

(22) Filed: Jul. 9, 2019

(65) Prior Publication Data

US 2021/0010525 A1     Jan. 14, 2021

(51) Int. Cl.
*F16B 37/04* (2006.01)
*F16B 39/24* (2006.01)

(52) U.S. Cl.
CPC .......... *F16B 37/047* (2013.01); *F16B 39/24* (2013.01)

(58) Field of Classification Search
CPC .... F16B 37/047; F16B 37/046; F16B 37/044; F16B 37/045; F16B 39/24; F16B 21/07; F16B 21/071; F16B 21/073; F16B 21/06; F16B 37/0842; F16B 37/0857
USPC ......................................... 411/520, 525, 526
See application file for complete search history.

(56) References Cited

U.S. PATENT DOCUMENTS

| | | | | |
|---|---|---|---|---|
| 2,379,892 A | * | 7/1945 | Ronald | F16B 37/02 411/526 |
| 2,809,686 A | * | 10/1957 | Shepherd | F16B 37/047 411/104 |
| 2,903,035 A | * | 9/1959 | Davenport | F16B 37/047 411/104 |
| 2,920,672 A | | 1/1960 | Bronson | |
| 3,292,479 A | * | 12/1966 | Tinnerman | F16B 21/073 24/581.1 |
| 3,322,177 A | | 5/1967 | Phelan | |
| 3,868,806 A | | 3/1975 | Dey | |
| 4,886,407 A | | 12/1989 | Harbin | |
| 5,435,124 A | | 7/1995 | Sadil et al. | |
| 7,207,762 B2 | * | 4/2007 | Teal | F16B 37/065 16/2.1 |
| 7,645,107 B2 | * | 1/2010 | Yoneoka | F16B 37/0857 411/437 |
| 8,083,450 B1 | | 12/2011 | Smith | |
| 2008/0310931 A1 | | 12/2008 | Csik et al. | |
| 2011/0315820 A1 | * | 12/2011 | Andre | B64C 1/26 244/117 R |

(Continued)

FOREIGN PATENT DOCUMENTS

| | | | | |
|---|---|---|---|---|
| DE | 9416583 U1 | * | 12/1994 | ............ F16B 41/002 |
| EP | 0601899 A1 | * | 6/1994 | ............ F16B 37/044 |

(Continued)

OTHER PUBLICATIONS

National Aerospace Standard Fed Sup Class 5340, Aug. 2001.
EP search report for EP19212416.2 dated Jul. 6, 2020.

*Primary Examiner* — Flemming Saether
(74) *Attorney, Agent, or Firm* — Getz Balich LLC

(57) ABSTRACT

An assembly is provided that includes a barrel nut, a barrel nut retainer and a fastener. The barrel nut includes a threaded aperture. The barrel nut retainer includes a one-way installation guide. The fastener is configured to thread into the threaded aperture. The fastener is further configured to pass through the threaded aperture and project into the one-way installation guide when the fastener is inserted into the barrel nut retainer along a first direction.

17 Claims, 8 Drawing Sheets

(56) References Cited

U.S. PATENT DOCUMENTS

| | | | | |
|---|---|---|---|---|
| 2013/0177367 A1* | 7/2013 | Benedetti | ............ | F16B 37/0842 |
| | | | | 411/337 |
| 2015/0377277 A1* | 12/2015 | Downey | ............. | F16B 37/0842 |
| | | | | 411/519 |
| 2018/0009543 A1* | 1/2018 | Journade | ................ | F16B 37/047 |
| 2019/0264725 A1* | 8/2019 | Forti | ..................... | F16B 37/043 |
| 2020/0173485 A1* | 6/2020 | Kuemmel | ............. | F16B 21/186 |

FOREIGN PATENT DOCUMENTS

| | | | | |
|---|---|---|---|---|
| EP | 0601899 B1 | | 7/1996 | |
| EP | 1182369 A2 * | | 2/2002 | .......... F16B 37/0842 |

\* cited by examiner

BARREL NUT RETAINER FROM ONE-WAY INSTALLATION GUIDE

BACKGROUND

1. Technical Field

This disclosure relates generally to a mechanical coupling and, more particularly, to a mechanical coupling using a barrel nut and a barrel nut retainer.

2. Background Information

It is known to use a barrel nut coupling system to connect a first component to a second component. The barrel nut coupling system may include a bolt, a barrel nut and a barrel nut retainer. During assembly, the barrel nut retainer is mated with the barrel nut. These mated elements are inserted together into a receptacle in the second component. A shank of the bolt is then sequentially passed through bolt holes in the first and the second components and threaded into a threaded aperture of the barrel nut.

The fastener may be threaded into the threaded aperture along a first direction or along an opposite second direction. In the first direction, the barrel nut may be located between the second component and the barrel nut retainer. The barrel nut may thereby contact and be pressed directly against the second component. By contrast, in the second direction, the barrel nut retainer may be located between the second component and the barrel nut. The barrel nut retainer may thereby be sandwiched between the barrel nut and the second component. As a result, when the bolt is tightened, (a) the bolt, the barrel nut, barrel nut retainer and/or the second component may be damaged due to improper seating of the barrel nut and/or (b) the bolt may be tightened to an inaccurate torque due to, for example, possible elastic deformation of the barrel nut retainer. There is a need in the art therefore for an improved barrel nut coupling system that prevents or reduces likelihood of improper mating of a fastener with a barrel nut.

SUMMARY OF THE DISCLOSURE

According to an aspect of the present disclosure, an assembly is provided that includes a barrel nut, a barrel nut retainer and a fastener. The barrel nut includes a threaded aperture. The barrel nut retainer includes a one-way installation guide. The fastener is configured to thread into the threaded aperture. The fastener is further configured to pass through the threaded aperture and project into the one-way installation guide when the fastener is inserted into the barrel nut retainer along a first direction.

According to another aspect of the present disclosure, another assembly is provided that includes a barrel nut, a barrel nut retainer and a fastener. The barrel nut includes a threaded aperture. The barrel nut retainer is abutted against the barrel nut. The barrel nut retainer includes a tubular base and a tab connected to a sidewall of the tubular base. The tab projects into a port in the sidewall of the tubular base. The fastener includes a shank and a head. The shank is threaded into the threaded aperture. The shank projects out from the head, through the threaded aperture, to a distal end portion of the shank that engages the tab.

According to still another aspect of the present disclosure, a coupling assembly is provided that includes a barrel nut retainer that includes a tubular sidewall, a first flange, a second flange and a tab. The tubular sidewall is configured with a first port and a second port. The first port extends along an axis through the tubular sidewall at a first side of the tubular sidewall. The second port extends along the axis through the tubular sidewall at a second side of the tubular sidewall. The first flange and the second flange project out from the first side of the tubular sidewall. The first port is located laterally between the first flange and the second flange. The tab projects into the second port from the tubular sidewall.

The barrel nut retainer may be formed as a monolithic body.

The barrel nut retainer may be formed from multiple different bodies that are attached together.

The one-way installation guide may be configured to prevent the fastener from projecting into the one-way installation guide when the fastener is inserted into the barrel nut retainer along a second direction that is opposite the first direction.

The one-way installation guide may be configured as or otherwise include a tab.

The tab may be configured to bend and then slide along the fastener when the fastener is inserted into the barrel nut retainer along the first direction. The tab may also or alternatively be configured to block passage of the fastener into the one-way installation guide when the fastener is inserted into the barrel nut retainer along a second direction that is opposite the first direction.

The tab may have a hooked configuration.

The barrel nut retainer may also include a base with a port. The tab may project out from the base into the port.

The tab may have a distal end. The tab may project away from the base to the distal end along a trajectory comprising a component along the first direction.

The one-way installation guide may also include a second tab. The second tab may project out from the base into the port. A diameter of the fastener may be greater than a distance between the tab and the second tab.

The base may be a tubular base. The port may extend through a sidewall of the tubular base.

The base may further include a first flange and a second flange. The barrel nut may be abutted against the base and may be located laterally between the first flange and the second flange.

The tab may include a base portion and an end portion connected to the base portion at a corner. The end portion may be angularly offset from the base portion by an acute included angle.

The one-way installation guide may also include a second tab.

The second tab may be diametrically opposed from the tab.

The assembly may also include a first component and a second component. The first component may be configured with or otherwise include a first fastener aperture. The second component may be configured with or otherwise include a second fastener aperture and a receptacle. The second component may be abutted against the first component. The barrel nut and the barrel nut retainer may be arranged within the receptacle. The fastener may extend sequentially through the first fastener aperture, the second fastener aperture and the threaded aperture and then may project into the one-way installation guide when the fastener is inserted into the barrel nut retainer along the first direction.

The assembly may include an aircraft propulsion system structure that includes the first component and the second component.

The tab may be configured to bend and then slide along the shank when the shank is inserted into the barrel nut retainer along a first direction. The tab may also or alternatively be configured to block passage of the shank into the port when the shank is inserted into the barrel nut retainer along a second direction that is opposite the first direction.

The barrel nut retainer may also include a second tab. The second tab may project into the port in the sidewall of the tubular base. A diameter of the shank may be greater than a distance between the tab and the second tab.

The foregoing features and the operation of the invention will become more apparent in light of the following description and the accompanying drawings.

DETAILED DESCRIPTION

Figure 1:
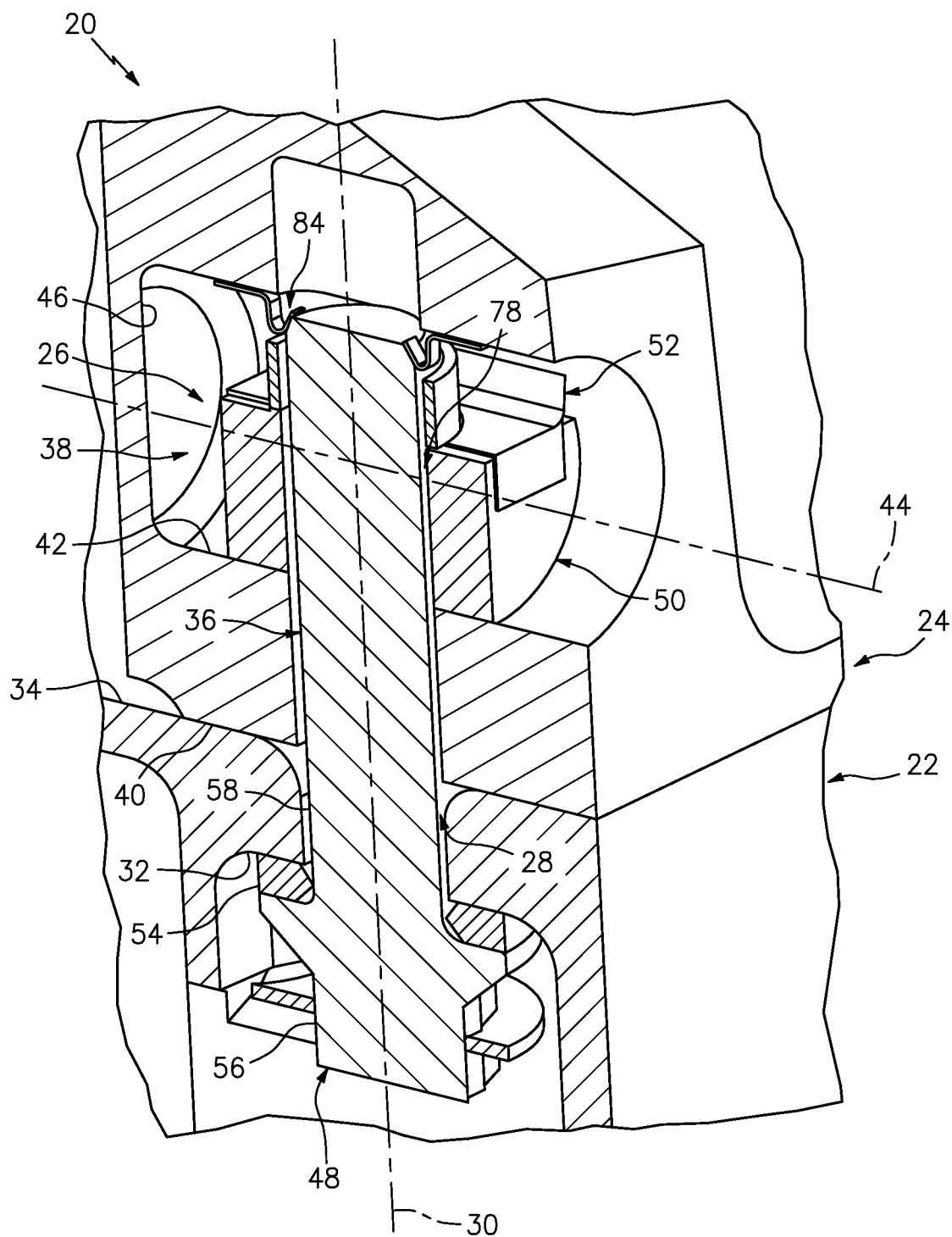
FIG. 1 is a perspective side sectional illustration of a portion of an assembly with a barrel nut coupling system.

FIG. 1 is a perspective sectional illustration of a portion of an assembly 20. This assembly 20 includes a first component 22, a second component 24 and a barrel nut coupling system 26 for connecting the first component 22 and the second component 24 together.

The first component 22 is configured with a first fastener aperture 28; e.g., a substantially cylindrical through-hole. This first fastener aperture 28 extends axially along an axis 30 (e.g., a centerline of the first fastener aperture 28) through the first component 22 between opposing first component surfaces 32 and 34 of the first component 22.

The second component 24 is configured with a second fastener aperture 36 (e.g., a substantially cylindrical through-hole) and a receptacle 38 (e.g., a substantially cylindrical blind hole). The second fastener aperture 36 extends axially along the axis 30 (e.g., a centerline of the second fastener aperture 36) through the second component 24 between opposing second component surfaces 40 and 42 of the second component 24. The second component surface 42 extends circumferentially around a centerline 44, which centerline 44 of FIG. 1 is perpendicular to and coincident with the axis 30. This second component surface 42 forms a circumferential periphery of the receptacle 38. The receptacle 38 of FIG. 1 extends longitudinally along the centerline 44 (e.g., partially) into the second component 24 to a receptacle end surface 46. However, in other embodiments, the receptacle 38 may extend longitudinally along the centerline 44 through the second component 24.

The coupling system 26 includes a fastener 48, a barrel nut 50 and a barrel nut retainer 52. The coupling system 26 of FIG. 1 also includes a washer 54.

Figure 2:
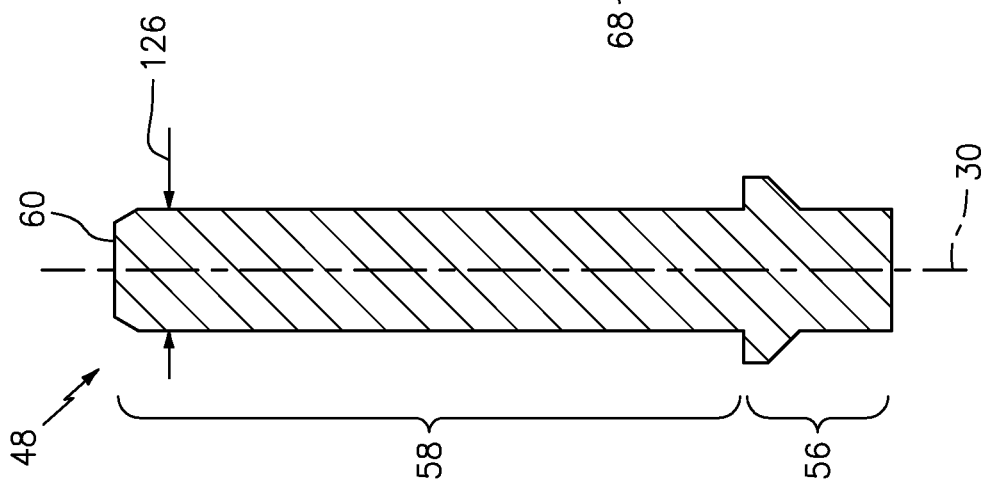
FIG. 2 is a side sectional illustration of a fastener.

Referring to FIG. 2, the fastener 48 may be configured as a bolt. The fastener 48 of FIG. 1 includes a head 56 and a shank 58. The shank 58 projects axially along the axis 30 (e.g., a centerline of the shank 58/fastener 48) out from the head 56 to a distal end 60 of the fastener 48. At least an end portion or an entirety of a length of the shank 58 is threaded.

Figure 4:
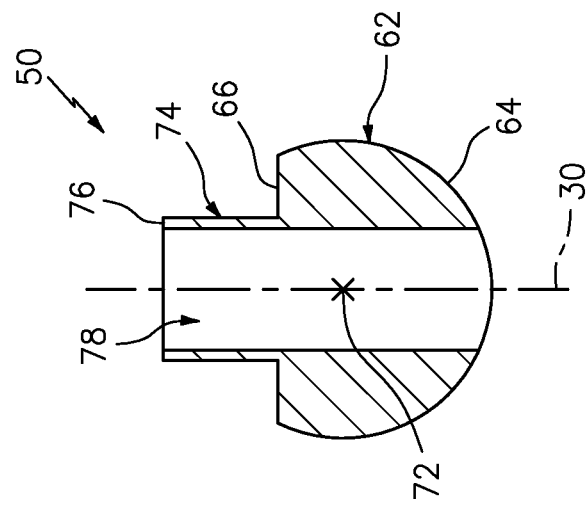
FIG. 4 is a cross-sectional illustration of the barrel nut.
Figure 3:
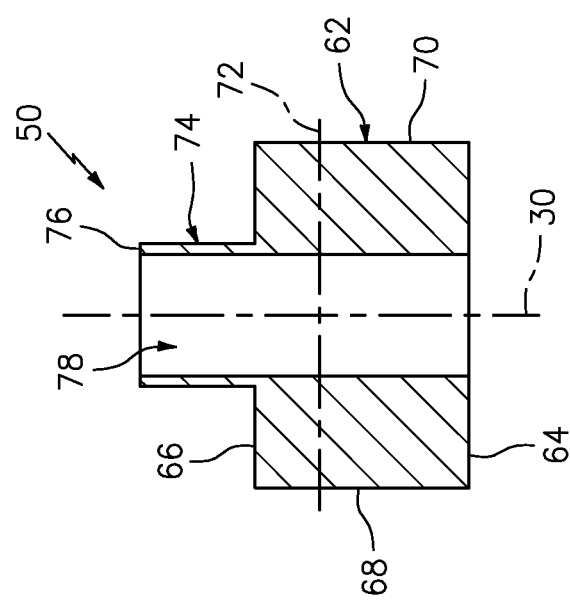
FIG. 3 is a side sectional illustration of a barrel nut.

Referring to FIGS. 3 and 4, the barrel nut 50 may be configured with a partially cylindrical body 62. The barrel nut 50 of FIGS. 3 and 4, for example, includes a curved side surface 64, a second (e.g., planar) side surface 66 and opposing end (e.g., planar) surfaces 68 and 70. The curved side surface 64 of FIG. 4 is a partially cylindrical surface. This curved side surface 64 extends circumferentially about a centerline 72 from a first edge of the second side surface 66 to an opposing second edge of the second side surface 66. The centerline 72 may be coaxial with the centerline 44 of the receptacle 38 (see FIG. 1) when mated with the receptacle 38 as described below. Referring to FIG. 3, the curved side surface 64 and the second side surface 66 each extends longitudinally along the centerline 72 between the end surfaces 68 and 70.

Referring again to FIGS. 3 and 4, the barrel nut 50 may also include a protrusion 74; e.g., a cylindrical protrusion or rim. This protrusion 74 projects axially along the axis 30 (e.g., a centerline of the protrusion 74) out from the barrel nut body 62 and its second side surface 66 to a distal end 76 of the protrusion 74.

The barrel nut 50 is configured with a threaded aperture 78. This threaded aperture 78 extends axially along the axis 30 (e.g., a centerline of the threaded aperture 78) through the barrel nut body 62 and the protrusion 74 between the curved side surface 64 and the distal end 76 of the protrusion 74.

Figure 5:
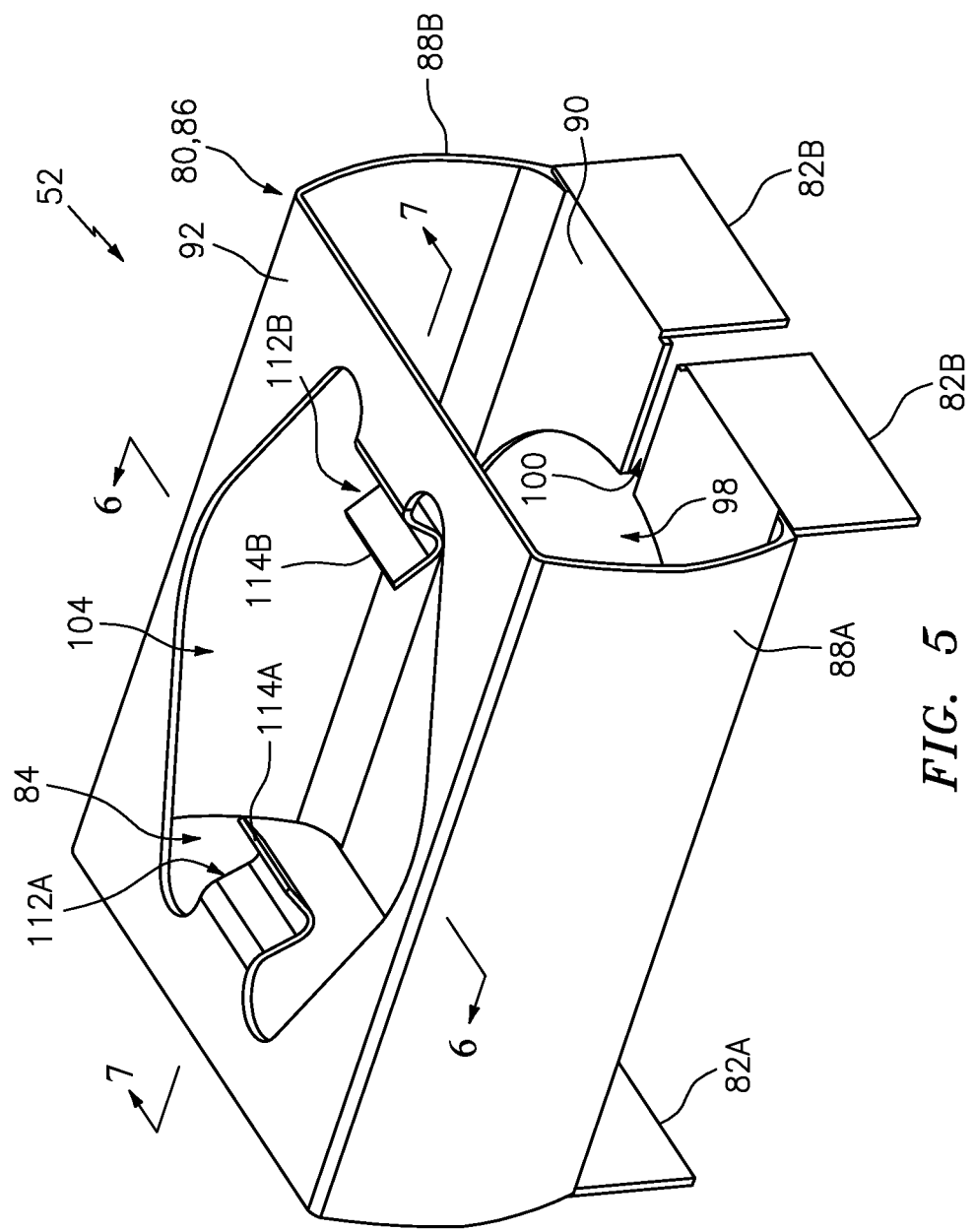
FIG. 5 is a perspective illustration of a barrel nut retainer.
Figure 6:
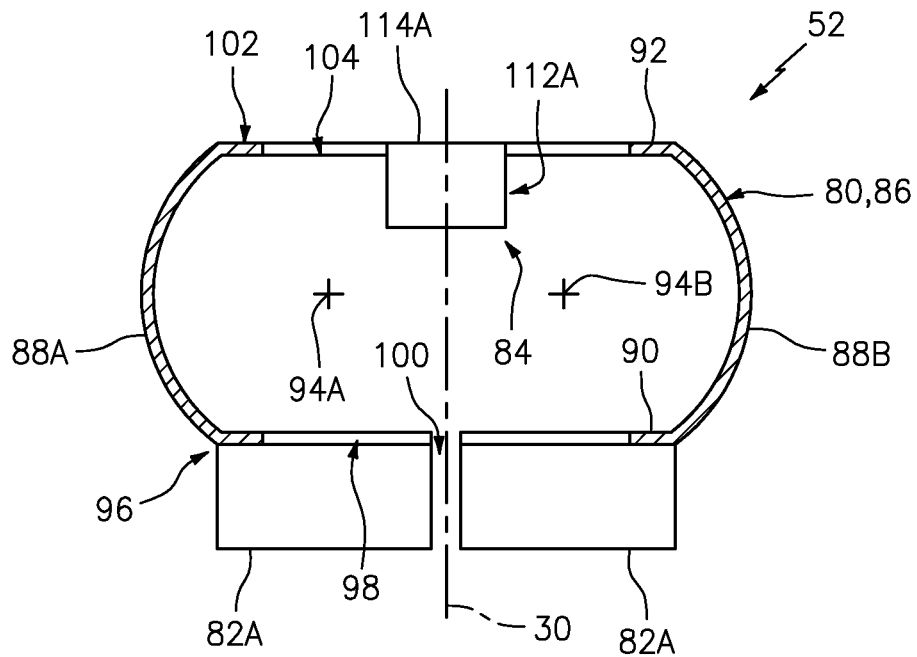
FIG. 6 is a cross-sectional illustration of the barrel nut retainer taken along line 6-6 in FIG. 5.
Figure 7:
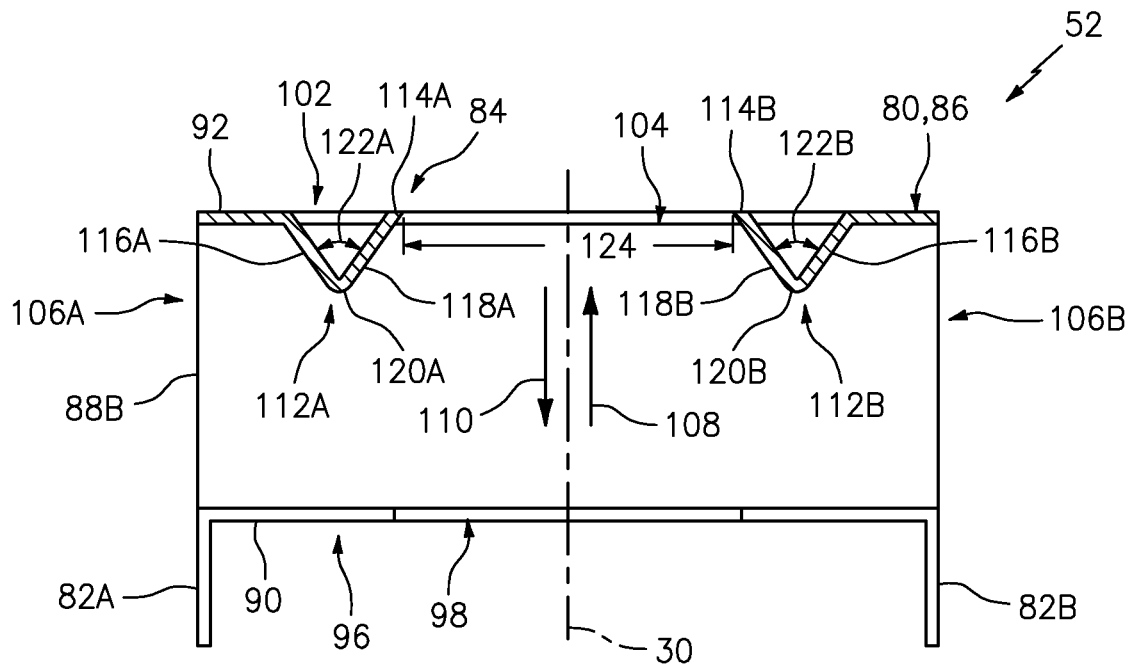
FIG. 7 is a side sectional illustration of the barrel nut retainer taken along line 7-7 in FIG. 5.

Referring to FIGS. 5-7, the barrel nut retainer 52 includes a (e.g., tubular) retainer base 80, one or more flanges 82A and 82B (generally referred to as "82") and a one-way installation guide 84; e.g., a one-way fastener gate.

The retainer base 80 is configured with a tubular sidewall 86. This tubular sidewall 86 is formed by one or more sidewall portions. These sidewall portions include opposing curved side portions 88A and 88B (generally referred to as "88") and opposing (e.g., planar) interior and exterior side portions 90 and 92. Each of these side portions 88 extends laterally between opposing ends of the retainer base 80.

Each of the curved side portions 88 of FIG. 6 is a partially cylindrical portion. The first curved side portion 88A extends circumferentially about a centerline 94A from a first edge of the interior side portion 90 to a first edge of the exterior side portion 92. The second curved side portion 88B extends circumferentially about a centerline 94B from a second edge of the interior side portion 90 to a second edge of the exterior side portion 92. The centerlines 94A and 94B may be parallel but separated as illustrated in FIG. 6. Alternatively, the centerlines 94A and 94B may be coaxial in other embodiments.

Referring to FIGS. 6 and 7, the interior side portion 90 is disposed at an interior side 96 of the retainer base 80. The interior side portion 90 is configured with an interior side port 98; e.g., a circular through-hole or alternatively a non-circular (e.g., oval) through-hole. This interior side port 98 extends axially along the axis 30 (e.g., a centerline of the interior side port 98) through the tubular sidewall 86 and its interior side portion 90. In the specific embodiment of FIG.

6, the interior side portion 90 also includes a slot 100. This slot 100 separates the interior side portion 90 into two halves and enables the barrel nut retainer 52 to be formed from a piece of cut and bent sheet material; e.g., sheet metal. The slot 100 may also enable resilient flexure of the retainer base 80.

Referring to FIGS. 6 and 7, the exterior side portion 92 is disposed at an exterior side 102 of the retainer base 80, which exterior side 102 is diametrically opposed to the interior side portion 90. The exterior side portion 92 is configured with an exterior side port 104; e.g., a through hole. This exterior side port 104 extends axially along the axis 30 (e.g., a centerline of the exterior side port 104) through the tubular sidewall 86 and its exterior side portion 92. In the embodiment of FIG. 5, the exterior side port 104 has a non-circular geometry; e.g., a generally diamond-shaped geometry. However, the present disclosure is not limited to such an exemplary exterior side port geometry. For example, in other embodiments, the exterior side port 104 may have a circular, oval, square, rectangular or any other suitable geometry.

Referring to FIGS. 6 and 7, one or more of the flanges 82 such as a pair of first flanges 82A are disposed at (e.g., one, adjacent or proximate) a first end 106A of the retainer base 80. These first flanges 82A are disposed on opposing sides of the slot 100. One or more of the flanges 82 such as a pair of second flanges 82B are disposed at (e.g., on, adjacent or proximate) a second end 106B of the retainer base 80. The second flanges 82B are disposed on opposing sides of the slot 100. Each of the flanges 82 projects out from the retainer base 80 and its interior side portion 90. Each of the flanges 82 is arranged perpendicular to the interior side portion 90; e.g., parallel to the axis 30.

Figure 8:
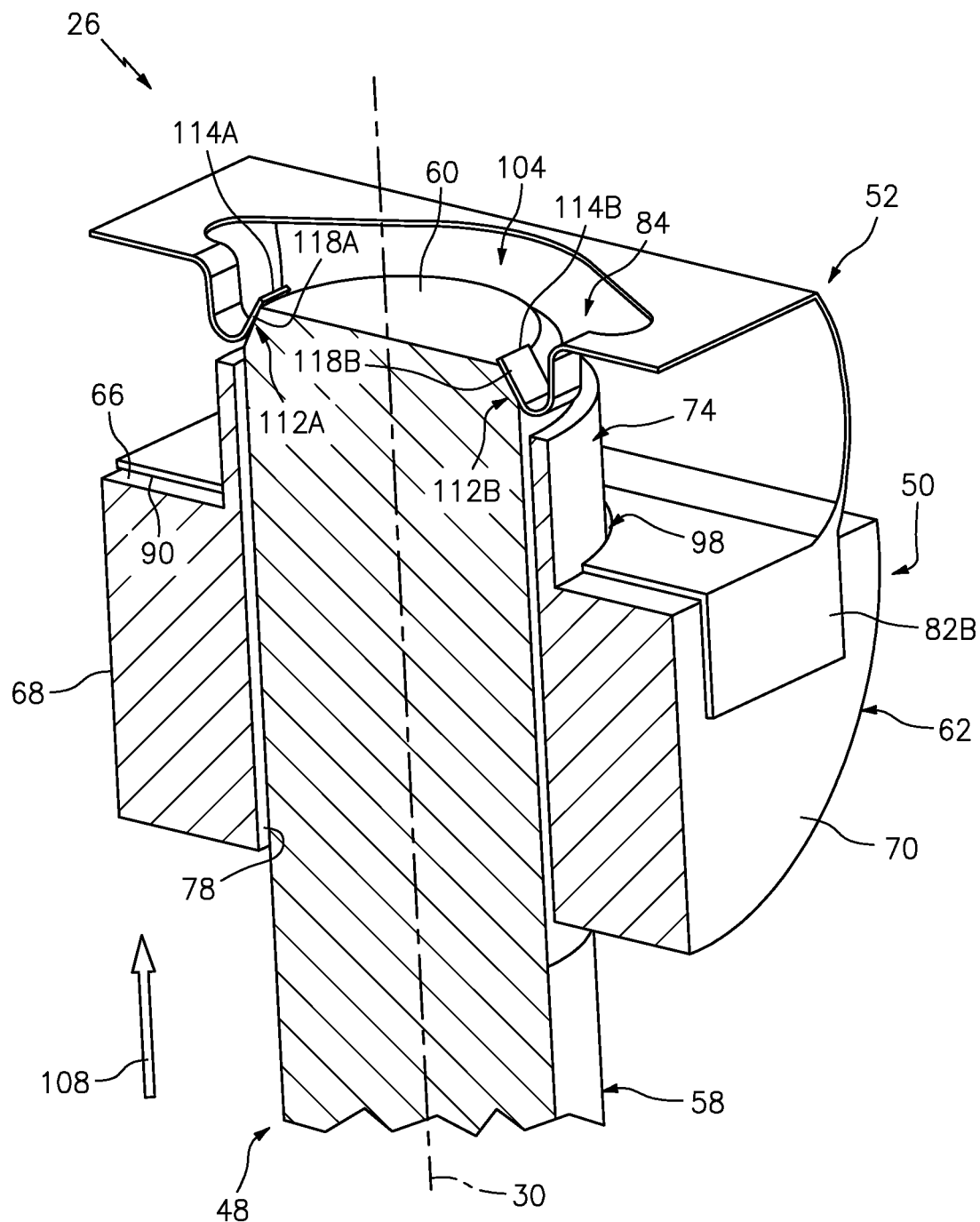
FIG. 8 is a perspective side sectional illustration of a portion of the barrel nut coupling system with the fastener inserted into the barrel nut retainer along a first direction.
Figure 9:
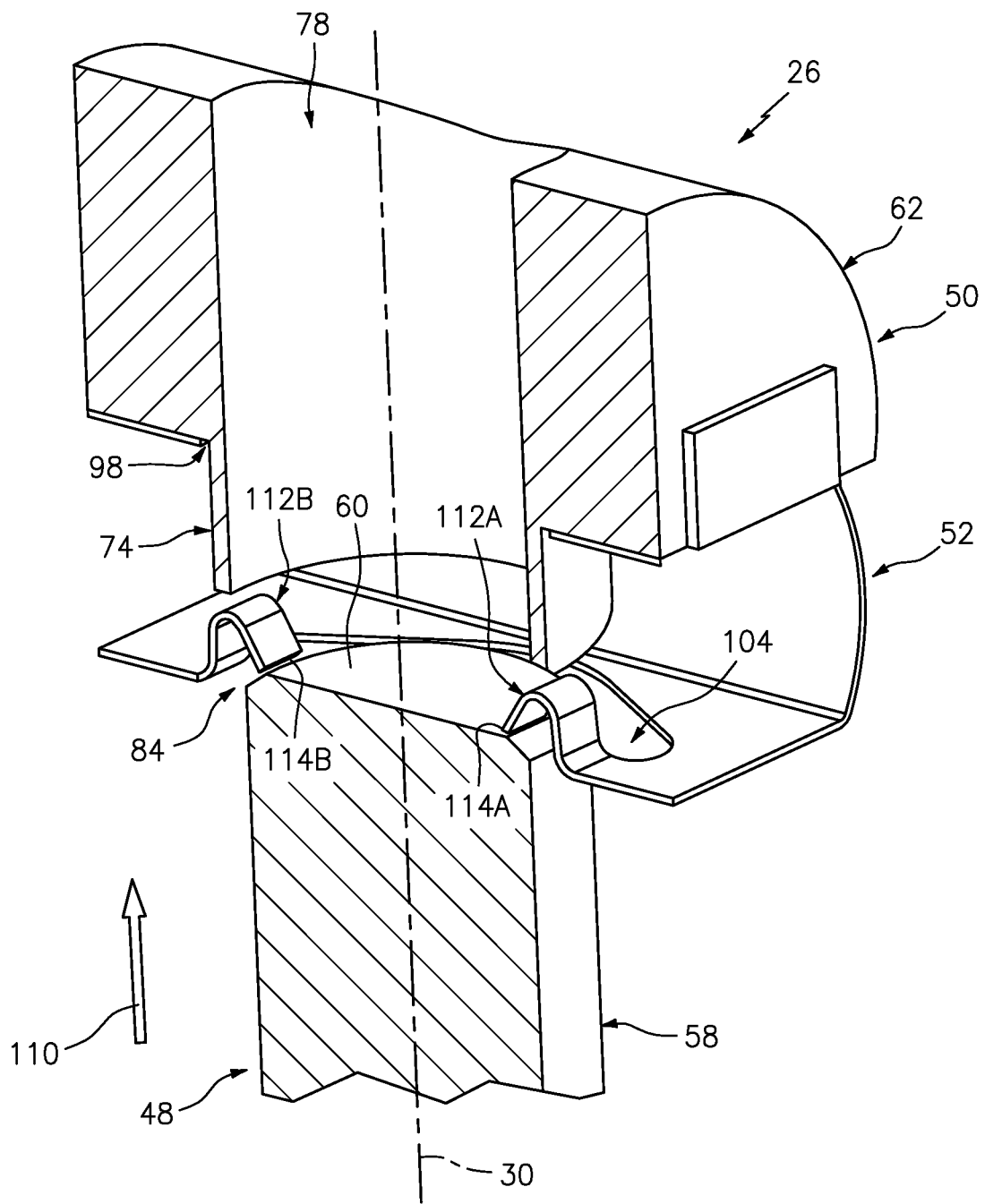
FIG. 9 is a perspective side sectional illustration of a portion of the barrel nut coupling system with the fastener inserted into the barrel nut retainer along a second direction.

Referring to FIG. 8, the one-way installation guide 84 is configured to enable the fastener 48 to properly mate with the barrel nut retainer 52 when inserted into the barrel nut retainer 52 along a first direction 108, relative to the retainer 52, along the axis 30. By contrast, referring to FIG. 9, the one-way installation guide 84 is configured to prevent the fastener 48 from mating with the barrel nut retainer 52 when inserted into the barrel nut retainer 52 along a second direction 110, relative to the retainer 52, along the axis 30, which second direction 110 is opposite the first direction 108. With this configuration, the one-way installation guide 84 may prevent improper assembly of the coupling system 26 as described below.

The one-way installation guide 84 of FIGS. 5-7 includes one or more tabs 112A and 112B (generally referred to as "112"). In the specific embodiment of FIG. 7, the tabs 112 are arranged on opposing sides of the exterior side port 104; e.g., diametrically disposed.

Each of the tabs 112 is cantilevered from the retainer base 80 at the exterior side 102. More particularly, each tab 112A, 112B projects out from the exterior side portion 92, into the exterior side port 104, to a distal end 114A, 114B of that tab 112A, 112B. Each tab 112 may have a hooked (e.g., J-shaped, U-shaped or V-shaped) configuration. Each tab 112A, 112B of FIG. 7, for example, includes base portion 116A, 116B and an end portion 118A, 118B connected to the base portion 116A, 116B at a corner 120A, 120B; e.g., an intermediate radiused portion of the tab.

The base portion 116A, 116B extends along a first trajectory from the exterior side portion 92 to the corner 120A, 120B. This first trajectory includes an axial component in the second direction 110. The first trajectory also includes a radial inward component relative to the axis 30. The first trajectory of FIG. 7 is a substantially straight-line trajectory. However, in other embodiments, the first trajectory may be a curved or otherwise non-straight-line trajectory.

The end portion 118A, 118B extends along a second trajectory from the corner 120A, 120B to the distal end 114A, 114B of that tab 112A, 112B. This second trajectory includes an axial component in the first direction 108. The second trajectory also includes a radial inward component relative to the axis 30. The second trajectory of FIG. 7 is a substantially straight-line trajectory. However, in other embodiments, the second trajectory may be a curved or otherwise non-straight-line trajectory.

The end portion 118A, 118B is angularly offset from the base portion 116A, 116B by an included angle 122A, 122B. This included angle 122A, 122B may be an acute angle such as, for example, between five (5) and sixty (60) degrees. The present disclosure, however, is not limited to such exemplary included angle values.

The distal ends 114A and 114B of the tabs 112A and 112B are separated by a (e.g., minimum) distance 124 when the tabs 112A and 112B are in a relaxed state; e.g., when the fastener 48 is not bending the tabs 112A and 112B as described below. This distance 124 is sized to be less than a (e.g., maximum or minimum) diameter 126 of the shank 58 of the fastener 48.

During assembly, the barrel nut 50 is mated with the barrel nut retainer 52 as shown in FIG. 8. In particular, the protrusion 74 projects axially through the interior side port 98. The second side surface 66 is abutted against and may contact the interior side portion 90. The barrel nut body 62 is located laterally between the first and the second flanges 82A and 82B (82A not visible in FIG. 8). The first end surface 68 may abut against and contact one or each of the first flanges 82A. The second end surface 70 may also or alternatively abut against and contact one or each of the second flanges 82B. The flanges 82 are thereby operable to laterally lock the barrel nut 50 to the barrel nut retainer 52. The flanges 82 may also serve as anti-rotation features to prevent rotation between the elements 50 and 52.

Referring to FIG. 1, the mated elements 50 and 52 are inserted into the receptacle 38. The first component 22 is arranged with the second component 24. The first component surface 34, for example, may be abutted against the second component surface 40. The fastener 48 is mated with the washer 54. In particular, the shank 58 is inserted into a bore of the washer 54. The shank 58 is subsequently mated with the first component 22, the second component 24, the barrel nut 50 and the barrel nut retainer 52. In particular, the shank 58 of the fastener 48 is inserted into and passed sequentially through the first fastener aperture 28, the second fastener aperture 36 and the threaded aperture 78 (e.g., threaded into the threaded aperture 78) and then inserted into the one-way installation guide 84.

Referring to FIG. 8, when the fastener 48 is inserted into the barrel nut retainer 52 along the first direction 108, the distal end 60 of the shank 58 is operable to push radially outwards against the end portions 118A and 118B of the tabs 112A and 112B such that the distal ends 114A and 114B move radially outward; e.g., away from one another. The shank 58 thereby bends the tabs 112 in a radially outward direction and the distance 124 (see FIG. 7) increases. As a result, an end portion of the shank 58 is operable to slide against and pass between the tabs 112. By contrast, referring to FIG. 9, if the fastener 48 was improperly inserted into the barrel nut retainer 52 along the second direction 110, the distal ends 114A and 114B of the tabs 112A and 112B are operable to block the distal end 60 of the shank 58 from passing between the tabs 112A and 112B. The tabs 112 are thereby operable to prevent the fastener 48 from projecting into the one-way installation guide 84. As a result, the head 56 and the washer 54 will not be abutted against the first component surface 34 (see FIG. 1), and a person assembling the coupling system 26 may be alerted that the barrel nut 50 and the barrel nut retainer 52 were inserted upside-down within the receptacle 38. This type of alert may be particularly useful where the receptacle 38 is visually blocked by one or more other adjacent elements.

Figure 10:
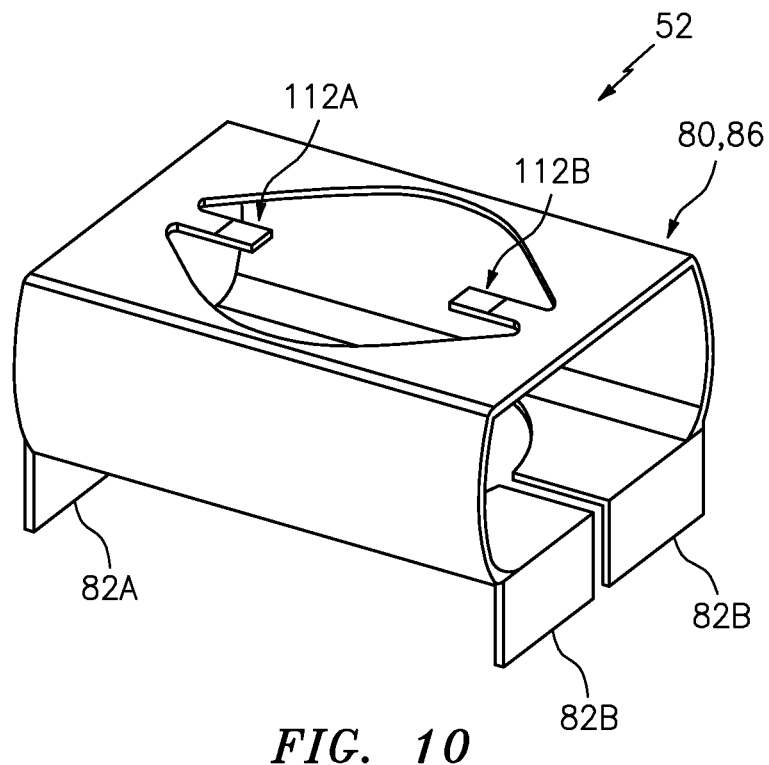
FIG. 10 is a perspective illustration of another barrel nut retainer.
Figure 11:
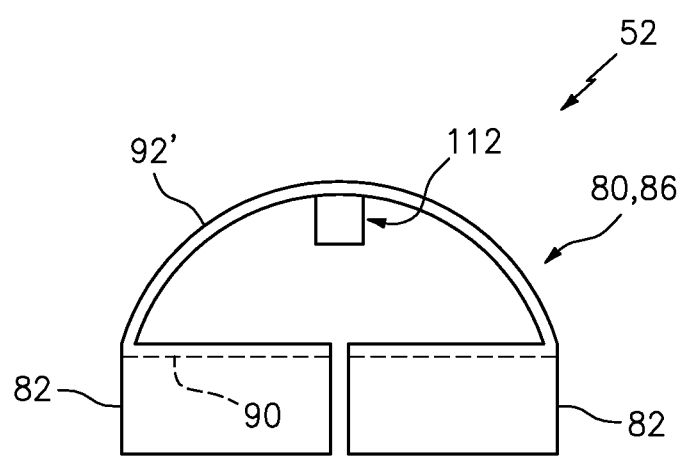
FIG. 11 is an end view illustration of still another barrel nut retainer.

The barrel nut retainer 52 and its one-way installation guide 84 may have various configurations other than that described above. For example, the one-way installation guide 84 may be configured with a single tab 112 or more than two tabs 112. One or more or each of the tabs 112 may have a planar configuration as shown, for example, in FIG. 10. The curved side portions 88 and the exterior side portion 92 may be configured into a single curved side portion 92' as shown, for example, in FIG. 11. One or more of the flanges 82A and/or 82B may be omitted. The slot 100 may be filled with weld and/or the halves of the interior side portion 90 may be otherwise connected. The present disclosure therefore is not limited to the foregoing exemplary barrel nut retainer 52 and one-way installation guide 84 configurations.

The barrel nut retainer 52 may be formed as a monolithic body. The term "monolithic body" is used herein to describe a single, unitary body formed (e.g., machined and shaped) as a single mass of material. The barrel nut retainer 52, for example, may be formed from a single cut and folded sheet of material; e.g., sheet metal. However, in other embodiments, the barrel nut retainer 52 may be formed from multiple bodies that are mechanically fastened, bonded (e.g., welded, brazed and/or adhered) and/or otherwise attached together. For example, the retainer base 80 and the flanges 82 may be formed together as a single body. The tabs 112 may be separately formed and subsequently may be attached to the retainer base 80. In another embodiment, the flanges 82 may also or alternatively be separately formed and may subsequently be attached to the retainer base 80.

Figure 12:
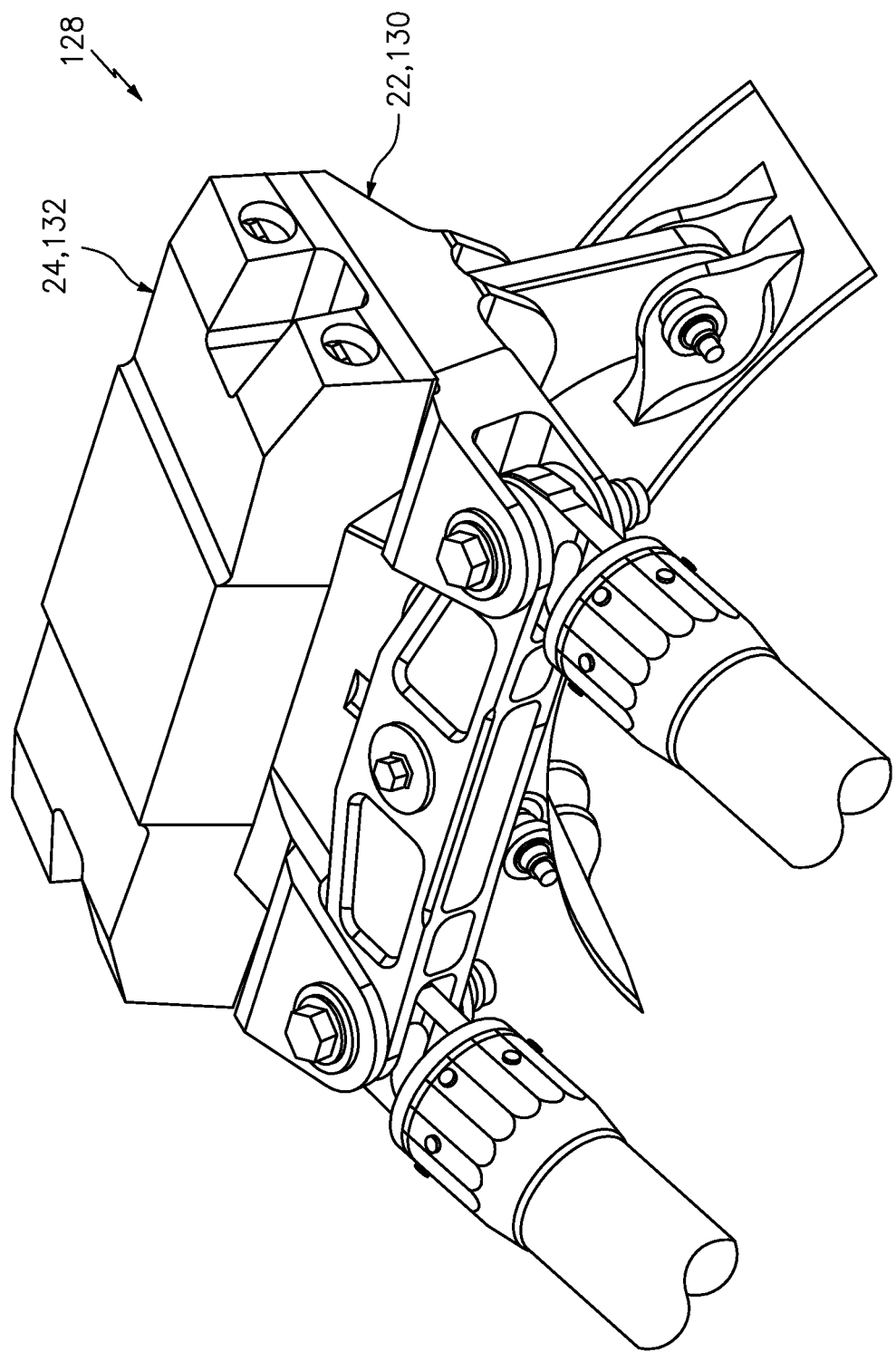
FIG. 12 is a perspective illustration of a portion of an aircraft propulsion system structure.

FIG. 12 is a partial illustration of an aircraft propulsion system structure 128. This structure 128 includes an engine mounting beam 130 and a pylon fitting 132; e.g., a pylon adaptor beam. The first component 22 of FIG. 1 may be configured as the engine mounting beam 130. The second component 24 of FIG. 1 may be configured as the pylon fitting 132. The present disclosure, of course, is not limited to such an exemplary configuration nor to aircraft propulsion system applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly, comprising:
   a barrel nut comprising a threaded aperture;
   a barrel nut retainer comprising a base and a one-way installation guide; and
   a fastener configured to thread into the threaded aperture, and the fastener further configured to pass through the threaded aperture and project into the one-way installation guide when the fastener is inserted into the barrel nut retainer along a first direction;
   wherein the one-way installation guide comprises a tab;
   wherein the tab comprises a base portion and an end portion connected to the base portion at a corner, and the end portion is angularly offset from the base portion by an acute included angle;
   wherein the base portion extends along a first trajectory from the base to the corner, and the first trajectory includes an axial component in a second direction that is opposite the first direction, and a radial inward component; and
   wherein the end portion extends along a second trajectory from the corner to a distal end of the tab, and the second trajectory includes an axial component in the first direction, and a radial inward component.

2. The assembly of claim 1, wherein the one-way installation guide is configured to prevent the fastener from projecting into the one-way installation guide when the fastener is inserted into the barrel nut retainer along the second direction.

3. The assembly of claim 1, wherein the tab is configured to
   bend and then slide along the fastener when the fastener is inserted into the barrel nut retainer along the first direction; and
   block passage of the fastener into the one-way installation guide when the fastener is inserted into the barrel nut retainer along the second direction.

4. The assembly of claim 1, wherein the tab has a hooked configuration.

5. The assembly of claim 1, wherein the base comprises a port; and
   the tab projects out from the base into the port.

6. The assembly of claim 5, wherein
   the one-way installation guide further comprises a second tab;
   the second tab projects out from the base into the port; and
   a diameter of the fastener is greater than a distance between the tab and the second tab.

7. The assembly of claim 5, wherein
   the base is a tubular base; and
   the port extends through a sidewall of the tubular base.

8. The assembly of claim 5, wherein
   the base further comprises a first flange and a second flange; and
   the barrel nut is abutted against the base and is located laterally between the first flange and the second flange.

9. The assembly of claim 1, wherein the one-way installation guide further comprises a second tab.

10. The assembly of claim 9, wherein the second tab is diametrically opposed from the tab.

11. The assembly of claim 9, wherein
    the second tab comprises a second base portion and a second end portion connected to the second base portion at a second corner, and the second end portion is angularly offset from the second base portion by an acute included angle;
    the second base portion extends along a third trajectory from the base to the second corner, and the third trajectory includes an axial component in the second direction, and a radial inward component; and
    the second end portion extends along a fourth trajectory from the second corner to a distal end of the second tab, and the fourth trajectory includes an axial component in the first direction, and a radial inward component.

12. The assembly of claim 1, further comprising:
a first component with a first fastener aperture; and
a second component with a second fastener aperture and a receptacle, the second component abutted against the first component;
the barrel nut and the barrel nut retainer arranged within the receptacle; and
the fastener extending sequentially through the first fastener aperture, the second fastener aperture and the threaded aperture and then projecting into the one-way installation guide when the fastener is inserted into the barrel nut retainer along the first direction.

13. The assembly of claim 12, further comprising an aircraft propulsion system structure that includes the first component and the second component.

14. An assembly, comprising:
a barrel nut comprising a threaded aperture;
a barrel nut retainer abutted against the barrel nut, the barrel nut retainer comprising a tubular base and a tab connected to a sidewall of the tubular base, and the tab projecting into a port in the sidewall of the tubular base; and
a fastener comprising a shank and a head, the shank threaded into the threaded aperture, and the shank projecting out from the head, through the threaded aperture, to a distal end portion of the shank that engages the tab;
the distal end portion of the shank engaging the tab in an axial first direction;
the tab comprising a base portion and an end portion connected to the base portion at a corner;
the base portion extending along a first trajectory from the sidewall of the tubular base to the corner, and the first trajectory including an axial component in an axial second direction that is opposite the axial first direction, and a radial inward component; and
the end portion angularly offset from the base portion by an acute included angle, the end portion extending along a second trajectory from the corner to a distal end of the tab, and the second trajectory including an axial component in the axial first direction, and a radial inward component.

15. The assembly of claim 14, wherein the tab is configured to bend and then slide along the shank when the shank is inserted into the barrel nut retainer along the axial first direction; and
block passage of the shank into the port when the shank is inserted into the barrel nut retainer along the axial second direction that is opposite the first direction.

16. The assembly of claim 14, wherein
the barrel nut retainer further comprises a second tab;
the second tab projects into the port in the sidewall of the tubular base; and
a diameter of the shank is greater than a distance between the tab and the second tab.

17. A coupling apparatus, comprising:
a barrel nut retainer comprising a tubular sidewall, a first flange, a second flange and a tab;
the tubular sidewall configured with a first port and a second port, the first port extending along an axis through the tubular sidewall at a first side of the tubular sidewall, and the second port extending along the axis through the tubular sidewall at a second side of the tubular sidewall;
the first flange and the second flange projecting out from the first side of the tubular sidewall, and the first port located laterally between the first flange and the second flange; and
the tab projecting into the second port from the tubular sidewall, the tab projecting out from the tubular sidewall along a first trajectory towards a distal end of the tab, and the first trajectory including an axial component in an axial direction towards the first port.

* * * * *